(12) United States Patent
Gennusa

(10) Patent No.: US 10,609,900 B2
(45) Date of Patent: Apr. 7, 2020

(54) TREAT HOLDER

(71) Applicant: Michael Gennusa, Mahopac, NY (US)

(72) Inventor: Michael Gennusa, Mahopac, NY (US)

(73) Assignee: Q2 Distribution, LLC, Mahopac, NY (US)

( * ) Notice: Subject to any disclaimer, the term of this patent is extended or adjusted under 35 U.S.C. 154(b) by 222 days.

(21) Appl. No.: 15/957,280

(22) Filed: Apr. 19, 2018

(65) Prior Publication Data

US 2018/0303061 A1    Oct. 25, 2018

Related U.S. Application Data

(60) Provisional application No. 62/489,042, filed on Apr. 24, 2017.

(51) Int. Cl.
*A01K 5/01* (2006.01)
*A01K 5/02* (2006.01)
*A01K 15/02* (2006.01)

(52) U.S. Cl.
CPC .......... *A01K 5/0114* (2013.01); *A01K 5/0275* (2013.01); *A01K 15/026* (2013.01)

(58) Field of Classification Search
CPC .. A01K 5/0114; A01K 5/0275; A01K 15/025; A01K 15/026; A24F 13/26
See application file for complete search history.

(56) References Cited

U.S. PATENT DOCUMENTS

| | | | | |
|---|---|---|---|---|
| 6,076,260 A | * | 6/2000 | Williamson, IV | A24F 13/26 30/113 |
| 2013/0277511 A1 | * | 10/2013 | Wendling | F16M 13/00 248/176.1 |
| 2018/0303071 A1 | * | 10/2018 | Allen, Jr. | B25B 5/006 |

* cited by examiner

*Primary Examiner* — Christopher D Hutchens
(74) *Attorney, Agent, or Firm* — Greenberg Traurig, LLP

(57) ABSTRACT

A holder for rigid and semi-rigid pet treats, to protect the pet from choking on the treat and other hazards, keep the treat in one location, and provide a base around the treat that makes it more conducive for pet enjoyment. The pet treat holder includes inner clamps, an outer clamp and a handle having a bolt for moving the clamps, to secure the treat within a transverse mouth opening of the holder.

8 Claims, 6 Drawing Sheets

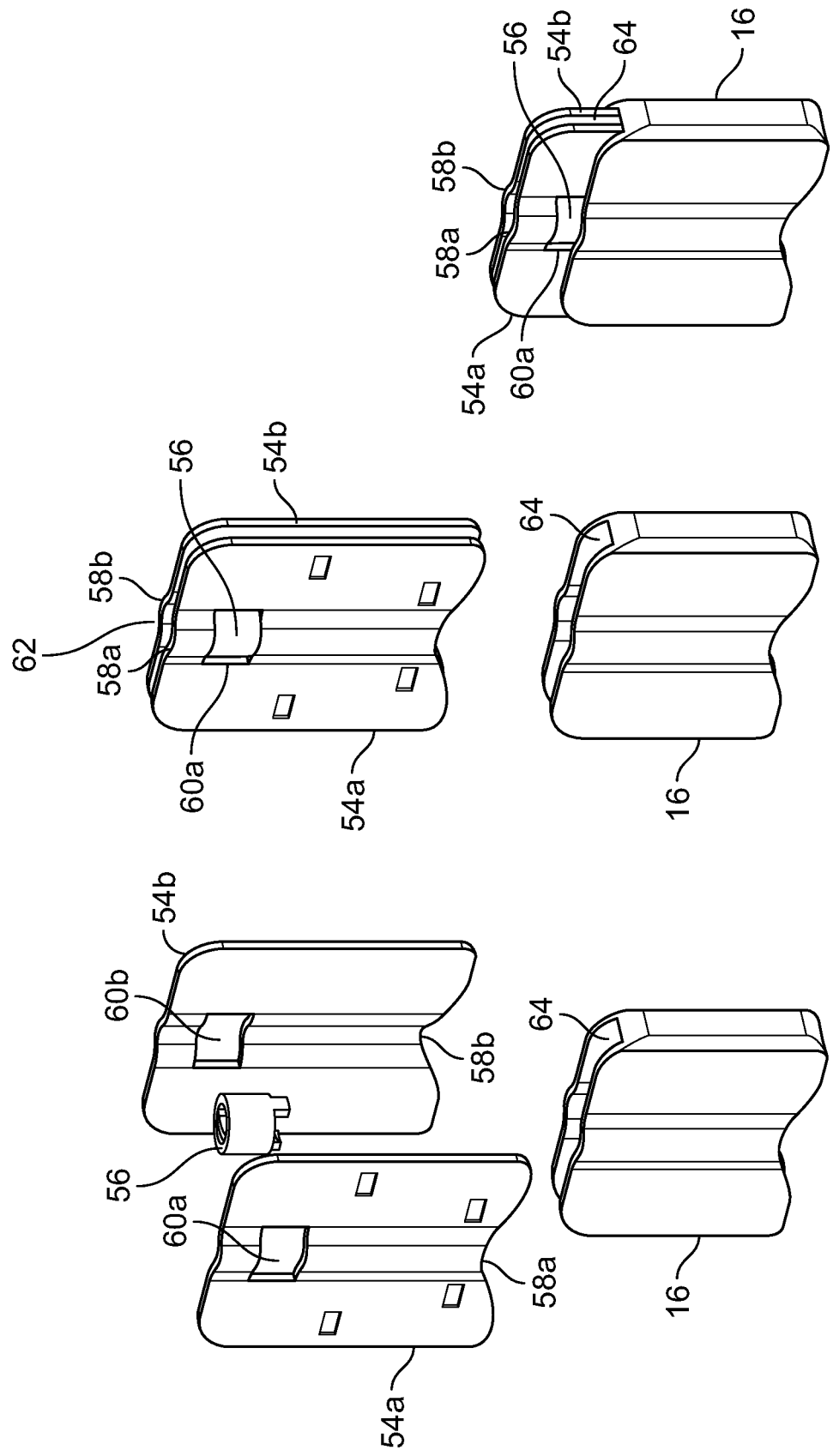

TREAT HOLDER

RELATED APPLICATION

This is a Section 111(a) application relating to and claiming the benefit of U.S. Provisional Patent Application No. 62/489,042, filed Apr. 24, 2017, the disclosure of which is incorporated by reference in its entirety herein.

FIELD OF THE INVENTION

The present invention relates to treat holders and, more particularly, to pet treat holders for rigid and semi-rigid pet treats.

BACKGROUND OF THE INVENTION

The present invention relates generally to a treat holder that holds conventionally available treats consumed mostly (but not exclusively) by dogs as a treat, but not as a primary food source, and administered by the pet owners. In an embodiment, the treat holder is used in connection with rigid and semi-rigid pet treats that are usually 6+ inches long and of a cylindrical shape like a pencil or drum stick. In other embodiments, there is no limit to the length of a treat that can be inserted. In an embodiment, the treat holder can accommodate treats slightly less than an inch in diameter.

Usually, the treats are harvested from animal tendons and pizzels and thoroughly dried to a very rigid state. They have no additives, are not manufactured, and are completely natural; and, therefore, they can be of varying lengths and widths (even within the same class, i.e., 6 inch, 12 inch, etc.). In addition, the treats usually do not have even diameters throughout their span. In other embodiments, the treat holder holds treats that have integrity, are hard to the touch, are almost bone like with little bend and cannot be easily swallowed or quickly consumed. In an embodiment, the treat holder can be used to hold bully sticks. In another embodiment, the treat holder can be used to hold rawhide chews.

Although these types of treats are very popular with both owners and pets alike, they are offered with some trepidation. They are almost impossible to swallow when they are full sized, but the concern increases as pieces are chewed off and the length diminishes. Some pets, especially larger pets, will chew a 6 inch treat down to two inches or so, and attempt to swallow the entire remaining portion. If the pet is successful in chewing the treat down to this size, one or more of the following four things can happen:

1. It leaves the pet with a solid mass in their stomach that cannot be readily digested, which they will regurgitate 24-48 hours later.
2. The pet will experience significant distress and need a veterinary visit to remedy.
3. The pet will get the treat lodged in their throat and need veterinary assistance to safely remove.
4. The pet will choke and die. Thus, some pet owners habitually hold this type of treat in their hand and never allow their pet to chew freely because of a fear of choking.

Depending on the size and volition of the animal, this type of treat is usually not quickly consumed. Some pets can take hours or days to completely ingest a treat; some will finish it in one sitting; and others need several sittings. Regardless, a pet with a treat does not always display behaviors that are consistent with the owner's wishes. Such behaviors may include:

1. Taking the treat and chewing it on the couch, on the rug, on top of an owner's clothes, towels or bed.
2. Attempting to hide the treat in the couch, behind the couch, backyard, under the rug, or some other inconvenient, inaccessible place, where it will rot and stink.
3. More seriously, having a conflict with another pet in the house; a dog's personality will often change when they have a treat or bone.
4. More serious again, possibly snapping at or even biting an owner or child who comes too close to their treat.

The value of the treat is also lost when it is not fully consumed because it is hidden or lost, which wastes money on treats that usually cost between $1.00 to over $10.00 each.

Thus, there is a need for a treat holder that holds a treat and allows the pet to safely take it therefrom.

SUMMARY

A holder for pet treats which includes a housing 12 having a transverse mouth opening 14 therethrough and a hollow interior 22 and a body lock 36, at least a first portion of which is sized and shaped to engage one end of the housing 12. The holder further includes a bolt 24 having a threaded shaft 26, a bolt head 28, and an annular recess 27 extending between the threaded shaft 26 and the bolt head 28. The bolt head 28 has a through-hole 30 for receiving a locking pin 32 therethrough, and the threaded shaft 26 defines a longitudinal axis A. A handle 34 of the holder is sized and shaped so as to receive the bolt head 28 and the locking pin 32 therein, and sized and shaped to align with at least a second portion of the body lock 36. First and second clamp sheets 44a, 44b have respective first and second mouth openings 46a, 46b, first and shaft openings 48a, 48b continuous with the first and second mouth openings 46a, 46b, respectively, and first and second arcuate dents 52a, 52b proximate end of the first shaft openings 48a, 48b and distal the first and second mouth openings 46a, 46b. The first and second mouth openings 46a, 46b are sized and shaped to align with one another and the transverse mouth opening 14. The first and second shaft openings 48a, 48b are sized and shaped to align with one another and to receive therein the threaded shaft 26 of the bolt 24. The arcuate dents 52a, 52b are sized and shaped to cooperate with one another to form an opening, the opening being sized and shaped to rotatably receive the annular recess 27 of the bolt 24 therethrough.

The holder further includes an outer clamp 16 having a hollow interior 64, the outer clamp 16 being sized and shaped to insertably engage the hollow interior 22 of the housing 12. First and second inner clamps 54a, 54b are also included. The first inner clamp 54a has a first arcuate trough 58a along an axis thereof, the first arcuate trough 58a defining a first socket opening 60a therein. The second inner clamp 54b has a second arcuate trough 58b along an axis thereof, the second arcuate trough 58b defining a second socket opening 60b therein. The first and second inner clamps 54a, 54b are sized and shaped to cooperate with one another to hold the clamp sheets 44a, 44b and the bolt 24 therebetween. The first and second arcuate troughs 56a, 58b cooperate to form an open shaft 62 that is sized and shaped to receive therethrough the threaded shaft 26 of the bolt 24. The hollow interior 64 of the outer clamp 16 is sized and shaped to receive the first and second inner clamps 54a, 54b therein.

An internally threaded sleeve 56 is sized and shaped to threadably engage the threaded shaft 26 of the bolt 24, and positioned between the first and second socket openings 60a, 60b. The outer clamp 16 is movable between a retracted position, in which the outer clamp 16 is positioned proximate the handle 34 and one end of the housing 12 and distal the transverse mouth opening 14, and a fully extended position, in which the outer clamp 16 is positioned distal the handle 34 and one end of the housing 12, and at least partially within the transverse mouth opening 14. Thus, rotation of the handle 34 rotates the bolt 24 about the axis A to longitudinally move the sleeve 56 within the open shaft 62, move the inner clamps 54a, 54b therewith, and move the outer clamp 16 between its retracted position and its fully extended position.

BRIEF DESCRIPTION OF THE DRAWINGS

For a more complete understanding of the present invention, reference is made to the following detailed description of an exemplary embodiment considered in conjunction with the accompanying drawings, in which:

FIGS. 9A, 9B and 9C are schematic perspective views showing an assembly of a pair of inner treat clamps with an outer treat clamp.

DETAILED DESCRIPTION OF EXEMPLARY EMBODIMENTS

Figure 1:
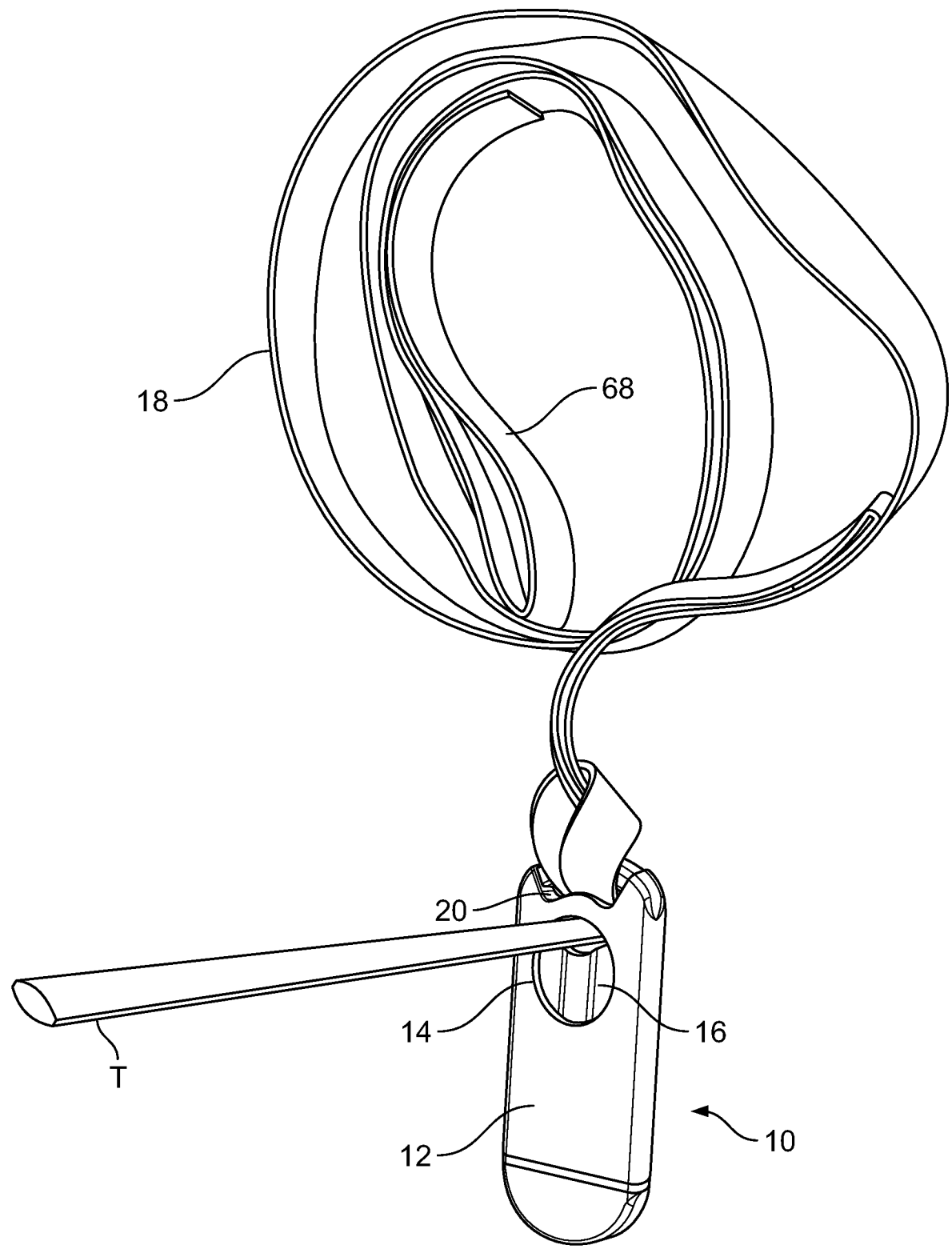
FIG. 1 is a perspective view of an exemplary embodiment of a treat holder in use holding a treat.
Figure 2:
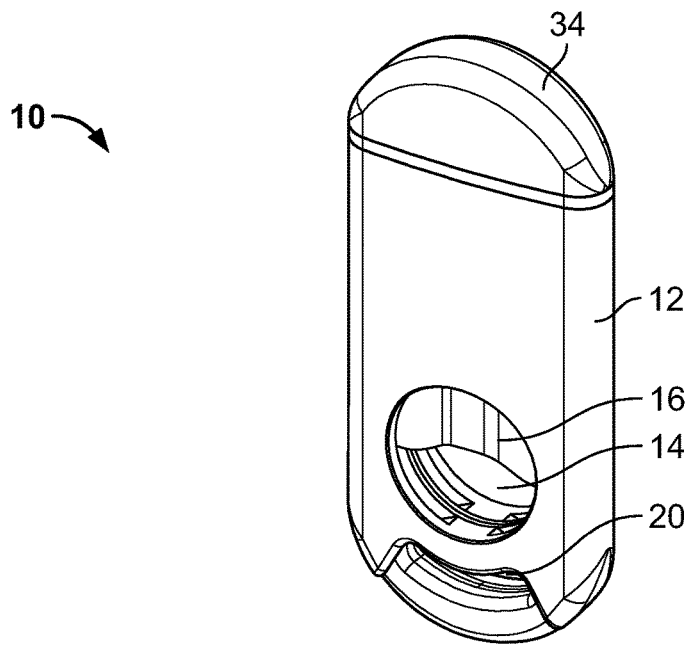
FIG. 2 is a perspective view of the treat holder of FIG. 1.
Figure 3:
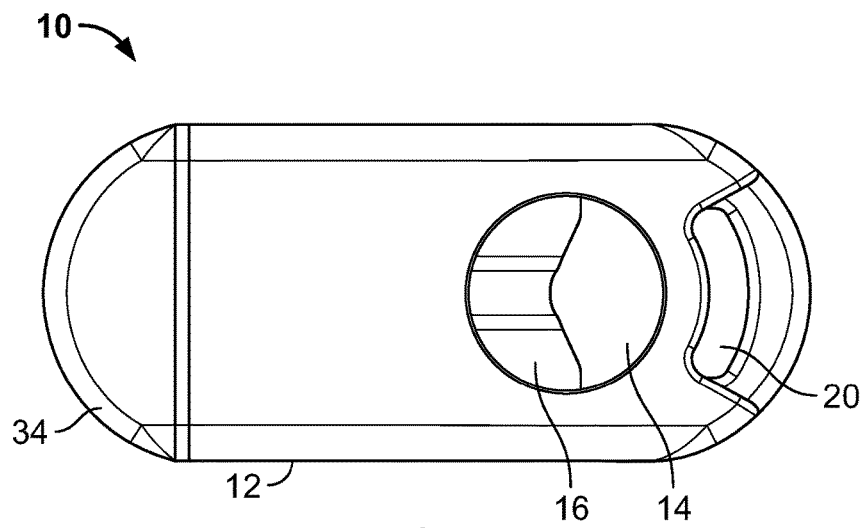
FIG. 3 is a front view of the treat holder of FIG. 1, of which the rear view is a mirror image.
Figure 4:
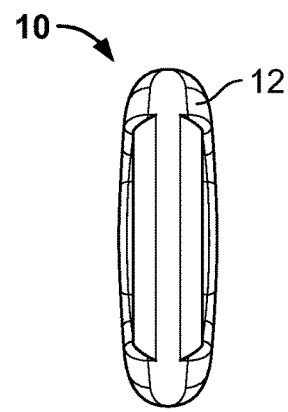
FIG. 4 is a bottom view of the treat holder of FIG. 1.
Figure 5:
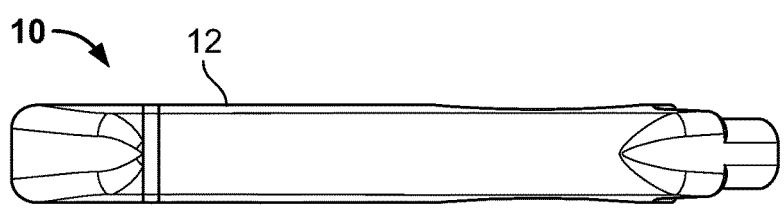
FIG. 5 is a left side view of the treat holder of FIG. 1, of which the right side view is a mirror image.

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms 'a,' "an," and "the" include the plural referents unless otherwise stated. Additionally, the terms "comprises" and "comprising" when used herein specify that certain features are present in that embodiment, however, this phrase should not be interpreted to preclude the presence or additional of additional steps, operations, features, components, and/or groups thereof.

The present disclosure generally relates to a pet treat holder. The treat holder is designed to be compact and have no exposed parts that could injure the pet during use. The treat holder is preferably sized proportionally to the average treat (e.g., about 0.5 inch diameter and about 6 inches long) to be held therein and is intended to be as unobtrusive as possible to the pet and fit in to their normal chewing routine. In various embodiments, the treat holder has a length of about 3.9 inches (about 99 mm), a width of about 1.7 inches (about 43.6 mm) and a thickness (i.e., height) of about 0.5 inches (about 12.6 mm).

When in use and holding a treat, the treat holder holds only approximately 0.5 inches of the treat stick so most of the treat stick is still available to the pet to enjoy. The treat holder and all its components are designed and built to withstand normal forces generated by a pet in tugging/pulling/yanking on a fixed object.

Referring to FIGS. 1-5, a treat holder 10 is shown holding a treat T (FIG. 1), as well as by itself (FIGS. 2-5). The treat holder 10 includes a housing 12 having a transverse "mouth" opening 14 for receiving the treat T therein and an outer treat clamp 16 for holding the treat T in the opening 14. The assembly and operation of the opening 14 and outer treat clamp 16 will be described in detail below. The housing 12 is sized and shaped to facilitate access by the pet to a treat that is held in the mouth opening 14 by outer treat clamp 16. An optional strap or tether 18 is attached to the housing 12, such as by looping through a strap opening 20 provided in the housing 12. In an embodiment, the housing 12 does not have a strap opening 20.

In an embodiment, the housing 12 has an oval shape, or quadrilateral shape with rounded corners, as shown in FIG. 1. In other embodiments, the housing 12 may have other shapes and sizes. The overall external shape of the treat holder 10 enhances the pet's ability to hold the treat T between its paws.

Figure 6:
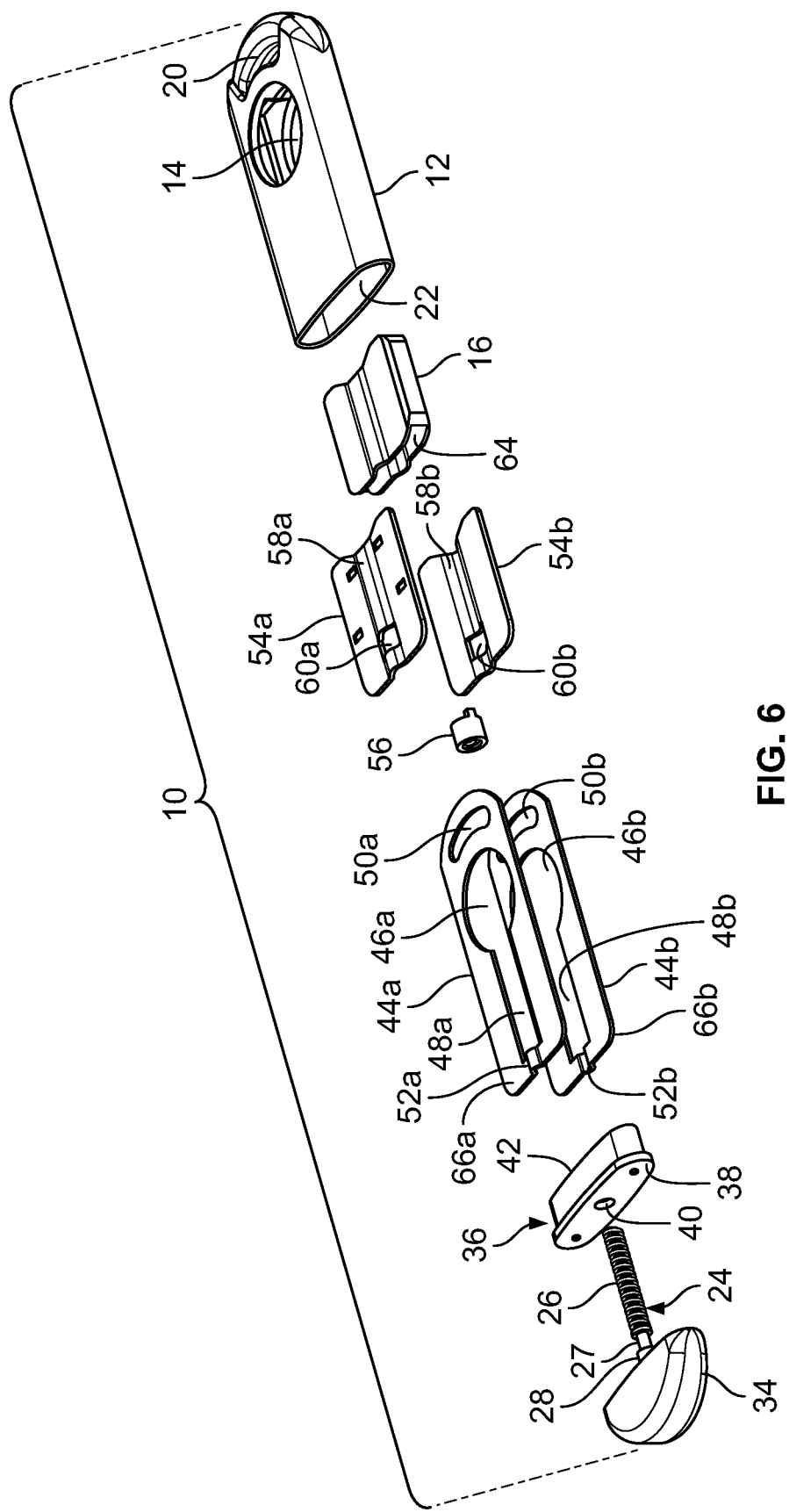
FIG. 6 is an exploded perspective view of the treat holder of FIG. 1.
Figure 7:
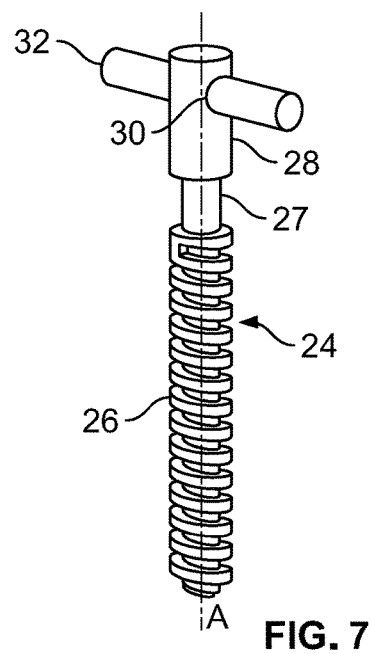
FIG. 7 is a perspective view of a bolt of the treat holder of FIG. 1.

Reference is made now to FIG. 6, which illustrates an embodiment of the treat holder 10 wherein the housing 12 has a hollow interior 22 into which the other components are inserted after assembly with one another, as will now be described. With reference also to FIG. 7, the treat holder 10 includes a bolt 24 having a threaded shaft 26 and a bolt head 28, with an annular recess 27 therebetween which is of smaller diameter than the bolt head 28 located at one end thereof and is for a purpose to be described below. The bolt head 28 of the bolt 24 has a through hole 30 to receive a locking pin 32 therethrough. When the bolt 24 and the locking pin 32 are assembled (see, e.g., FIGS. 7, 8A and 8B), the locking pin 32 is oriented perpendicularly to the threaded shaft 26 of the bolt 24. As indicated in FIG. 7, the threaded shaft 26 defines a longitudinal axis A, and is aligned therewith. The treat holder 10 includes a handle 34 having a hollow interior (not shown) to receive the assembled bolt head 28 and the locking pin 32 therein. When the bolt 24, the locking pin 32, and the handle 34 are assembled together, rotation of the handle 34, by a user, about the axis A (see FIG. 7) of the threaded shaft 26 of the bolt 24 causes rotation of the bolt head 28 and the locking pin 32, which in turn causes rotation of the threaded shaft 26 about its axis A. The handle 34 is capable of turning or rotating both clockwise and counterclockwise for reasons which will be explained hereinafter.

With reference again to FIG. 6, the treat holder 10 includes a body lock 36 having a cover portion 38 which is sized and shaped to align with the handle 34 and enclose the hollow interior (not visible in the figures) of the handle 34 with the locking pin 32 and a portion of the bolt head 28 therein. The cover portion 38 of the body lock 36 includes a centered opening 40 to receive the threaded shaft 26 of the bolt 24 therethrough. The body lock 36 also includes a cap portion 42 adjacent to the cover portion 38. The cap portion 42 of the body lock 36 is sized and shaped to insertably engage the hollow interior 22 of the housing 12, for a purpose which will become clear below.

Figure 8A:
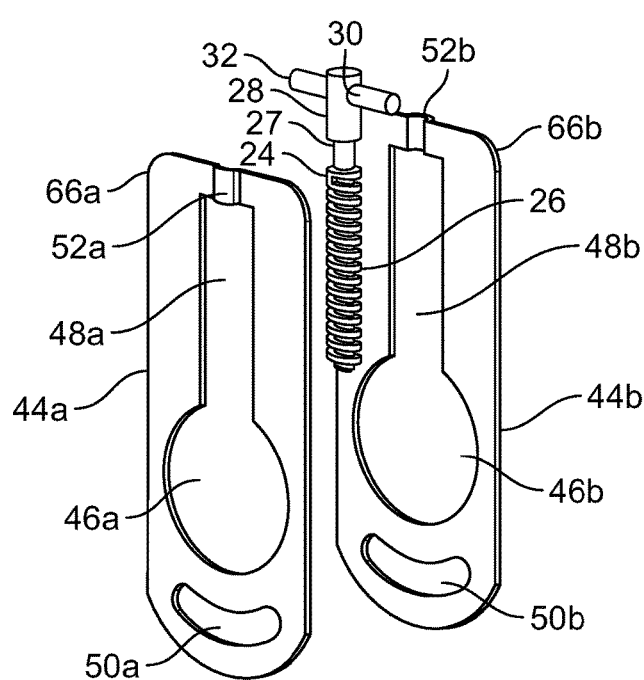
FIGS. 8A and 8B are schematic perspective views showing an assembly of a pair of clamp sheets with the bolt of FIG. 7.
Figure 8B:
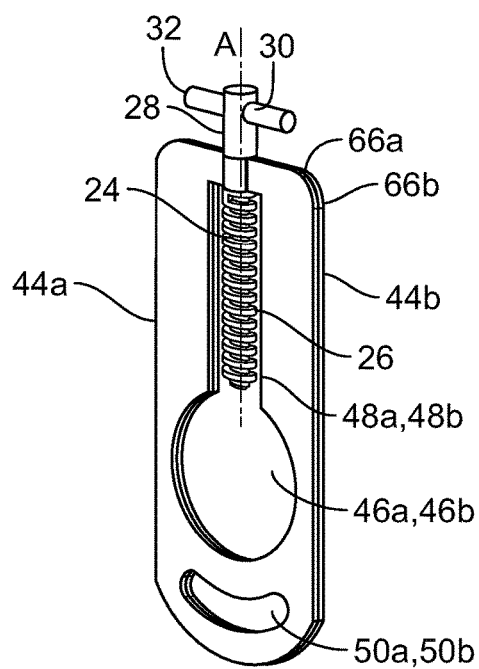

With reference now to FIGS. 6, 8A and 8B, the treat holder 10 also includes a pair of mirror image clamp sheets 44a, 44b, each having mouth openings 46a, 46b, respectively, which are sized and shaped to align with each other and the mouth opening 14 of the housing 12 when the treat holder 10 is assembled. Each of the clamp sheets 44a, 44b includes shaft openings 48a, 48b, each of which merge with their respective mouth opening 46a, 46b, each of which is sized and shaped to align with one another and receive therein the threaded shaft 26 of the bolt 24 when the treat holder 10 is assembled. Each of the clamp sheets 44a, 44b includes strap openings 50a, 50b, respectively, which are sized and shaped to align with each other and the strap opening 20 of the housing 12 when the treat holder 10 is assembled.

As shown in FIGS. 8A and 8B, each of the clamp sheets 44a, 44b includes an arcuate dent 52a, 52b, respectively, which cooperate with one another when the clamp sheets 44a, 44b are aligned with each other to form an opening for rotatably receiving the annular recess 27 of the bolt 24 therethrough. More particularly, the clamp sheets 44a, 44b are assembled by layering and aligning them with each other, with the bolt 24 positioned therebetween such that the annular recess 27 of the bolt 24 is rotatably received in the opening formed by the arcuate dents 52a, 52b, and the threaded shaft 26 of the bolt 24 is positioned within the aligned shaft openings 48a, 48b of the aligned clamp sheets 44a, 44b.

With reference now to FIGS. 6, 9A, 9B and 9C, the treat holder 10 further includes a pair of mirror image inner treat clamps 54a, 54b. The inner treat clamps 54a, 54b are sized and shaped to be assembled and cooperate with one another to hold therebetween an internally threaded sleeve 56, as well as the assembled clamp sheets 44a, 44b with the bolt 24 therebetween. For reasons which will become clear below, the sleeve 56 is sized and shaped to fit over and threadedly engage with the threaded shaft 26 of the bolt 24. In some embodiments, such as shown in FIGS. 6, 9A, 9B and 9C, the inner treat clamps 54a, 54b are generally sheet-like and each includes a central arcuate trough 58a, 58b, respectively. Each of the troughs 58a, 58b has a socket opening 60a, 60b, respectively, for receiving the sleeve 56 therein when the inner treat clamps 54a, 54b are assembled together. When the inner treat clamps 54a, 54b are assembled with one another, the arcuate troughs 58a, 58b align and cooperate to form an open shaft 62 (see FIGS. 9B and 9C) for receiving therethrough the threaded shaft 26 of the bolt 24. The outer treat clamp 16 has a hollow interior 64 which is open at one end for receiving therein at least a portion of the assembled inner treat clamps 54a, 54b (see especially FIG. 9C).

In some embodiments, assembly of the treat holder 10 may be according to the following procedure. The bolt 24 and handle 34 are assembled together as described above and shown in FIG. 6. The threaded shaft 26 of the bolt 24 is then inserted through opening 40 in the cover portion 38 of the body lock 36 until the cover portion 38 meets the handle 34. Next, the clamp sheets 44a, 44b are aligned with one another and the bolt 24 so that the arcuate dents 52a, 52b align on each side of the annular recess 17 of the bolt 24, and the cap portion 42 of the body lock 36 covers and holds together the upper portions 66a, 66b of the aligned clamp sheets 44a, 44b. In this configuration, the bolt 24 is rotatable about the axis A within the aligned arcuate dents 52a, 52b and the aligned shaft openings 48a, 48b (see, e.g., FIG. 8B showing the clamp sheets 44a, 44b assembled with the bolt 24 but without the handle 34). The inner treat clamps 54a, 54b may now be aligned on either side of the assembled clamp sheets 44a, 44b so that the arcuate troughs 58a, 58b are aligned on either side of the threaded shaft 26 of the bolt 24, and the socket openings 60a, 60b are aligned on either side of the sleeve 56. In this configuration, the sleeve 56, which is threadedly engaged with the threaded shaft 26 of the bolt 24, is moveable within the open shaft 62 formed by the aligned arcuate troughs 58a, 58b. Further, when the sleeve 56 moves within the open shaft 62, the assembled and aligned inner treat clamps 54a, 54b will also move along the same path. The assembled inner treat clamps 54a, 54b are inserted into the hollow interior 64 of the outer treat clamp 16 whereby they are held together and covered by the outer treat clamp 16. Finally, the housing 12 is slid over the assembled inner treat clamps 54a, 54b and outer treat clamp 16, until the housing 12 contacts the cover portion 38 of the body lock 36, thereby forming a closed and contained treat holder 10.

Figure 10A:
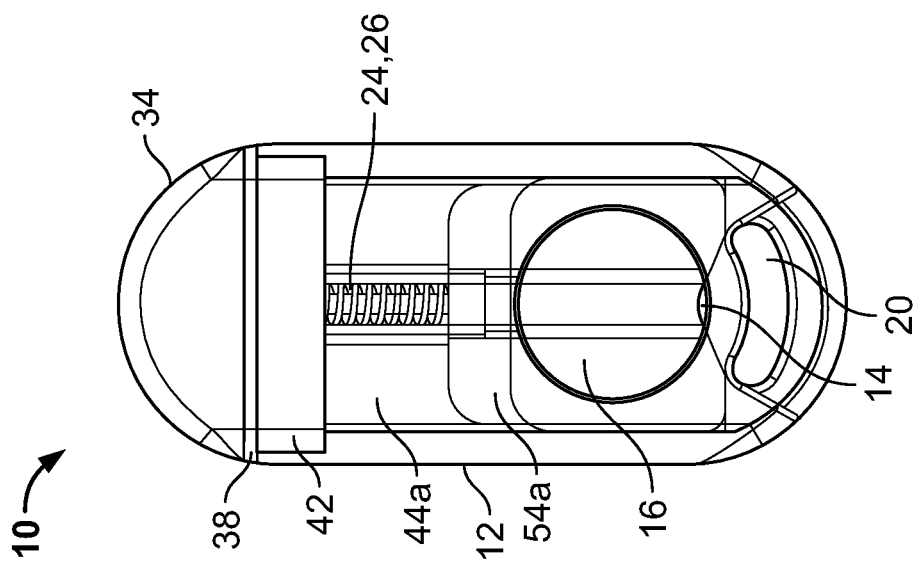
FIGS. 10A, 10B and 10C are schematic views of a partially transparent treat holder showing operation of the treat holder and various positions of the outer treat clamp.
Figure 10B:
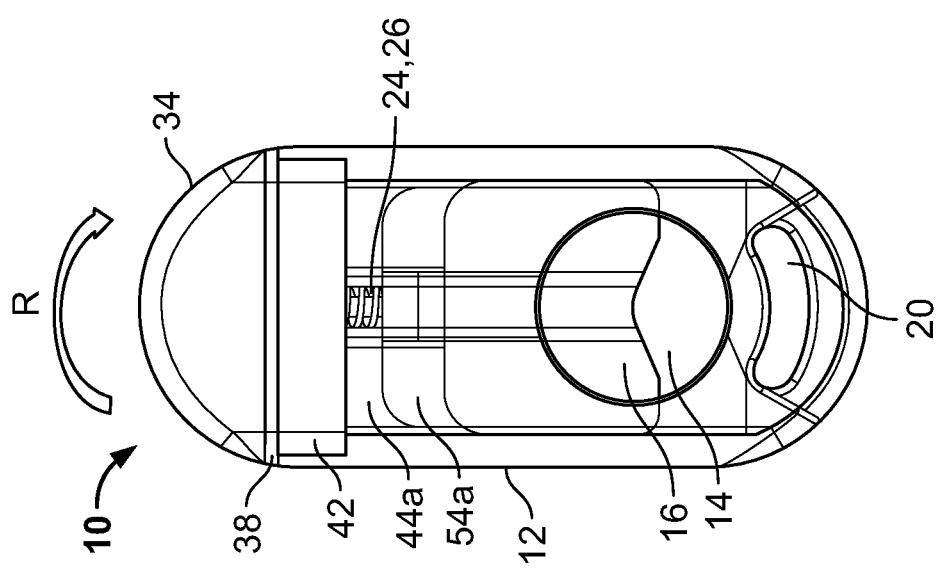
Figure 10C:
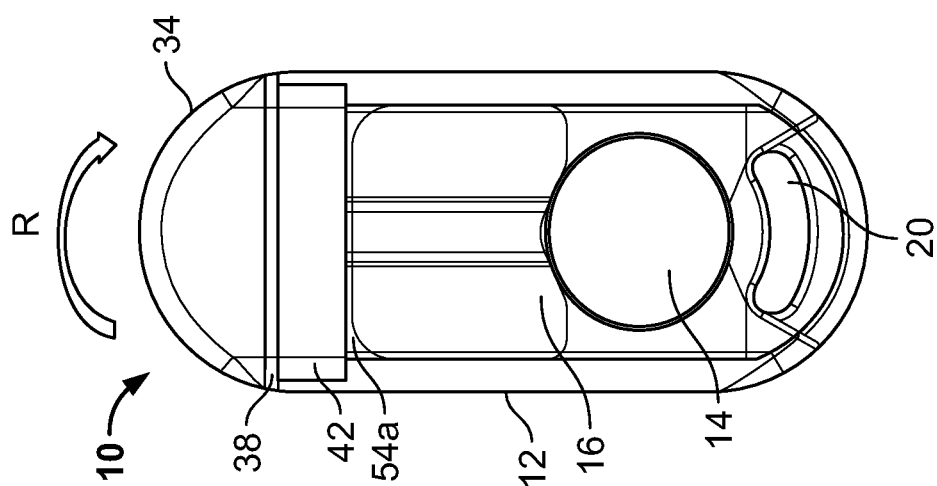

With reference now to FIGS. 10A, 10B and 10C, after complete assembly of all components as just described to form an assembled treat holder 10, the outer treat clamp 16 will be movable between a retracted position, in which the outer treat clamp 16 is fully positioned within the housing 12 and not visible in the mouth opening 14 (see FIG. 10A), and a fully extended position, in which the outer treat clamp 16 covers and closes the mouth opening 14 (FIG. 10C). Movement between the retracted and fully extended positions is accomplished by rotating the handle 34 as described earlier above (and shown by arrows R in FIGS. 10A and 10B), which rotates the bolt 24 and its threaded shaft 26, causing the sleeve 56 to move within the aligned arcuate troughs 58a, 58b of the inner treat clamps 54a, 54b, which in turn moves the outer treat clamp 16. The aforesaid mechanism, which employs a threaded engagement of the threaded shaft 26 and the sleeve 56, allows a user to rotate the handle 34 and position the outer treat clamp 16 to any position intermediate of and including the retracted and fully extended positions, which allows the treat holder 10 to accommodate any size treat that fits within the mouth opening 14. FIG. 10B shows one such intermediate position of the outer treat clamp 16 in the mouth opening 14 of the housing 12. In use, the handle 34 would be rotated until the outer treat clamp 16 pressed and clamped on the treat, trapping the treat in the mouth opening 14 (see, e.g., FIG. 1). Moreover, as mentioned above, the handle 34 is capable of rotating both clockwise, for moving the outer treat clamp 16 to grip a treat in the mouth opening 14, and counterclockwise, for moving the outer treat clamp 16 to release a treat in the mouth opening 14. After a pet has chewed the treat and there remains only a small piece of the treat (e.g., about 0.5 inches of length), the remaining piece should be discarded to avoid choking by the pet.

The treat holder 10 includes a vice-like clamp (formed by a combination of the mouth opening 14 of the housing 12 and the outer treat clamp 16). As shown in FIG. 1, the treat T is inserted into the mouth opening 14 and held in place as the pet owner (user) turns the handle 34 in a clockwise rotation that allows the clamp 16 to close on to the treat T. The pet owner may continue rotating the handle 34 until the force exerted is enough to elicit an ever so slight bend in the treat T. This fully employs the clamp technology to ensure maximum grip.

In an embodiment, the housing 12 and each of the other components with which the dog may come into contact (i.e., the outer treat clamp 16, the handle 34, and the body lock 36) is made of a material that is safe for dogs, such as without limitation, nylon or another tough, lightweight, elastic synthetic polymer material. Nylon is known to be safe for dogs (see, e.g., NYLABONE® dog toys marketed by Nylabone Corporation, but not related to the treat holder 10 described herein). The remaining interior components (i.e., the bolt 24, the clamp sheets 44a, 44b, the sleeve 56, and the inner treat clamps 54a, 54b) may be made of any material strong enough to maintain its shape and withstand stresses encountered as a result of, for example, dropping or chewing the treat holder 10. In an embodiment, the bolt 24, the clamp sheets 44a, 44b, the sleeve 56, and the inner treat clamps 54a, 54b are each made of stainless steel. In another embodiments, the bolt 24, the clamp sheets 44a, 44b, the sleeve 56, and the inner treat clamps 54a, 54b are made from other types of metal materials.

As shown in FIG. 1, the end of the tether 18 opposite the treat holder 10 may be a closed loop handle 68 that can placed over a door knob, attached to a table leg (wrap around and thread device through loop handle) or almost any other object the pet owner desires to keep the treat in one place. The purpose is to keep the pet from removing the treat T to the location of their choice. The tether 18 is completely adjustable by the pet owner. In an embodiment, the tether 18 is adjustable from 1 to 6 feet in length, depending on how close the owner wants to keep the pet to the anchor point. If the owner should so choose, the tether 18 can be removed completely leaving just the housing 12 of the treat holder 10 locked on to the treat. This allows the pet to roam, but still prevents choking.

When used properly, the treat holder 10 may facilitate the following:

1. Preventing pets from choking or swallowing indigestible portions of rigid and semi-rigid treats.
2. Alleviating the need for pet owners to hold treats of this type to prevent the hazards listed above.
3. Keeping the treat in one location, to preclude the pet from removing the treat to consume it in a non-preferential location.
4. Keeping the treat in one location, to preclude the pet from misplacing its treat.
5. Providing a base around the treat that makes it more conducive for pet enjoyment.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that the embodiments described herein are merely exemplary and that a person skilled in the art may make many variations and modifications without departing from the spirit and scope of the invention. All such variations and modifications are intended to be included within the scope of the invention and the appended claims.

I claim:

1. A pet treat holder, comprising:
   a housing having a transverse mouth opening therethrough and a hollow interior;
   a body lock, at least a first portion of which is sized and shaped to engage one end of the housing;
   a bolt having a threaded shaft, a bolt head, and an annular recess extending between the threaded shaft and the bolt head, the bolt head having a through-hole for receiving a locking pin therethrough, wherein the threaded shaft defines a longitudinal axis A;
   a handle sized and shaped so as to receive the bolt head and the locking pin therein, and sized and shaped to align with at least a second portion of the body lock,
   a first clamp sheet having a first mouth opening, a first shaft opening continuous with the first mouth opening, and a first arcuate dent proximate an end of the first shaft opening and distal the first mouth opening;
   a second clamp sheet having a second mouth opening, a second shaft opening continuous with the second mouth opening, and a second arcuate dent proximate an end of the second shaft opening and distal the second mouth opening;
      wherein the first and second mouth openings are sized and shaped to align with one another and the transverse mouth opening;
      wherein the first and second shaft openings are sized and shaped to align with one another and to receive therein the threaded shaft of the bolt; and
      wherein the arcuate dents are sized and shaped to cooperate with one another to form an opening, the opening being sized and shaped to rotatably receive the annular recess of the bolt therethrough;
   an outer clamp having a hollow interior, the outer clamp being sized and shaped to insertably engage the hollow interior of the housing;
   a first inner clamp having a first arcuate trough along an axis thereof, the first arcuate trough defining a first socket opening therein;
   a second inner clamp having a second arcuate trough along an axis thereof, the second arcuate trough defining a second socket opening therein;
      wherein the first and second inner clamps are sized and shaped to cooperate with one another to hold the clamp sheets and the bolt therebetween;
      wherein the first and second arcuate troughs cooperate to form an open shaft that is sized and shaped to receive therethrough the threaded shaft of the bolt; and
      wherein the hollow interior of the outer clamp is sized and shaped to receive the first and second inner clamps therein; and
   an internally threaded sleeve sized and shaped to threadably engage the threaded shaft of the bolt, and positioned between the first and second socket openings;
   wherein the outer clamp is movable between a retracted position, in which the outer clamp is positioned proximate the handle and one end of the housing and distal the transverse mouth opening, and a fully extended position, in which the outer clamp is positioned distal the handle and one end of the housing, and at least partially within the transverse mouth opening,
   whereby rotation of the handle rotates the bolt about the axis A to longitudinally move the sleeve within the open shaft, move the inner clamps therewith, and move the outer clamp between its retracted position and its fully extended position.

2. The pet treat holder of claim 1, wherein the outer clamp and the transverse mouth opening cooperate to secure a pet treat therebetween when the outer clamp is in its fully extended position.

3. The pet treat holder of claim 1, wherein the first portion of the a body lock is a cap portion which is sized and shaped to insertably engage one end of the housing.

4. The pet treat holder of claim 1, wherein the second portion of the body lock is a cover portion, and the cover portion includes a centered opening for receiving the threaded shaft of the bolt therethrough.

5. The pet treat holder of claim 1, further including a strap, the strap being attached to the housing via a strap opening provided in the housing.

6. The pet treat holder of claim 1, wherein the housing is made of nylon.

7. The pet treat holder of claim 1, wherein the bolt, the clamp sheets, the sleeve, and the inner treat clamps are each made of stainless steel.

8. The pet treat holder of claim 1, wherein the housing has an oval shape.

* * * * *